US010309871B2

(12) United States Patent
Hagan, Jr.

(10) Patent No.: US 10,309,871 B2
(45) Date of Patent: Jun. 4, 2019

(54) TRAILER FOR MEASURING OPERATING CHARACTERISTICS OF A VEHICLE

(71) Applicant: Ford Global Technologies, LLC, Dearborn, MI (US)

(72) Inventor: Daniel Lee Hagan, Jr., Oakland, MI (US)

(73) Assignee: Ford Global Technologie, LLC, Dearborn, MI (US)

( * ) Notice: Subject to any disclaimer, the term of this patent is extended or adjusted under 35 U.S.C. 154(b) by 226 days.

(21) Appl. No.: 15/272,516

(22) Filed: Sep. 22, 2016

(65) Prior Publication Data

US 2018/0080852 A1   Mar. 22, 2018

(51) Int. Cl.
| | |
|---|---|
| *G01M 15/00* | (2006.01) |
| *G01M 15/10* | (2006.01) |
| *B60D 1/155* | (2006.01) |
| *B60D 1/24* | (2006.01) |
| *B60W 10/04* | (2006.01) |
| *B60W 10/30* | (2006.01) |
| *B60W 20/10* | (2016.01) |
| *B60W 30/18* | (2012.01) |
| *B62D 59/04* | (2006.01) |
| *B60D 1/62* | (2006.01) |

(52) U.S. Cl.
CPC ........... *G01M 15/102* (2013.01); *B60D 1/155* (2013.01); *B60D 1/248* (2013.01); *B60D 1/62* (2013.01); *B60W 10/04* (2013.01); *B60W 10/30* (2013.01); *B60W 20/10* (2013.01); *B60W 30/18009* (2013.01); *B62D 59/04* (2013.01); *B60W 2300/14* (2013.01); *B60W 2530/10* (2013.01); *B60W 2550/142* (2013.01); *B60W 2710/06* (2013.01); *B60W 2710/08* (2013.01); *B60W 2750/40* (2013.01); *B60Y 2300/181* (2013.01); *Y10S 903/93* (2013.01)

(58) Field of Classification Search
CPC combination set(s) only.
See application file for complete search history.

(56) References Cited

U.S. PATENT DOCUMENTS

| | | |
|---|---|---|
| 4,771,838 A | 9/1988 | Ketcham |
| 5,450,748 A | 9/1995 | Evans et al. |
| 5,559,420 A | 9/1996 | Kohchi |

(Continued)

*Primary Examiner* — James M McPherson
(74) *Attorney, Agent, or Firm* — David Kelley; Brooks Kushman P.C.

(57) ABSTRACT

A vehicle trailer for attaching to a vehicle and analyzing operating characteristics of the vehicle is provided. The trailer includes a frame having a tongue configured to attach to a vehicle. The trailer has its own designated powertrain configured to propel and brake the trailer independent from the vehicle. A connecting member is configured to attach to an exhaust pipe of the vehicle and includes an emissions sensor configured to detect emissions from the exhaust pipe. At least one controller is coupled to the emissions sensor and is configured to analyze the emissions. The trailer can also be attached to the vehicle via an attachment member and configured to propel the vehicle across a range of increasing speeds while a powertrain of the vehicle is in neutral, and measure forces required to propel the vehicle across the range of speeds utilizing a force gauge on the attachment member.

11 Claims, 4 Drawing Sheets

(56) References Cited

U.S. PATENT DOCUMENTS

| | | | |
|---|---|---|---|
| 5,983,628 A * | 11/1999 | Borroni-Bird | ............ F01N 3/05 |
| | | | 60/274 |
| 6,281,646 B1 | 8/2001 | Masberg et al. | |
| 6,419,037 B1 | 7/2002 | Kramer et al. | |
| 6,691,013 B1 | 2/2004 | Brown | |
| 7,325,638 B1 | 2/2008 | Belloso | |
| 8,141,667 B2 | 3/2012 | Shepard, Jr. et al. | |
| 8,214,108 B2 | 7/2012 | Post, II et al. | |
| 8,627,908 B2 | 1/2014 | Wellborn et al. | |
| 8,863,866 B2 | 10/2014 | Pfister | |
| 8,991,528 B2 | 3/2015 | Hellholm et al. | |
| 2006/0076836 A1 | 4/2006 | Plishner | |
| 2010/0065344 A1* | 3/2010 | Collings, III | ............ B60L 3/10 |
| | | | 180/2.1 |
| 2010/0065348 A1 | 3/2010 | Arad | |
| 2012/0061154 A1 | 3/2012 | Pfister | |
| 2012/0200065 A1* | 8/2012 | Cruz | ........................ B60D 1/06 |
| | | | 280/477 |
| 2012/0245796 A1 | 9/2012 | Yu et al. | |
| 2018/0106204 A1* | 4/2018 | McCarthy, Jr. | ...... F02D 41/3005 |

\* cited by examiner

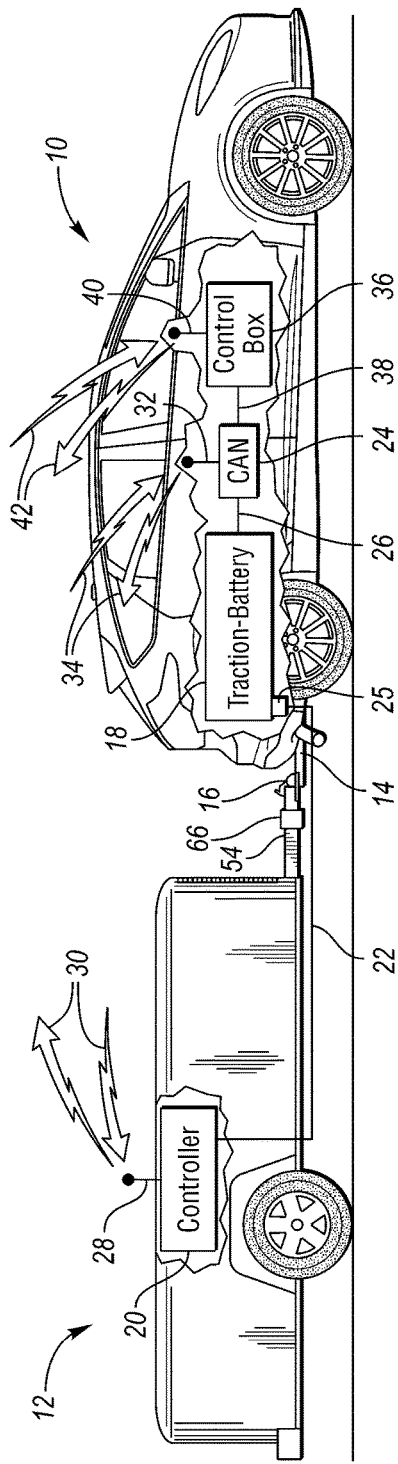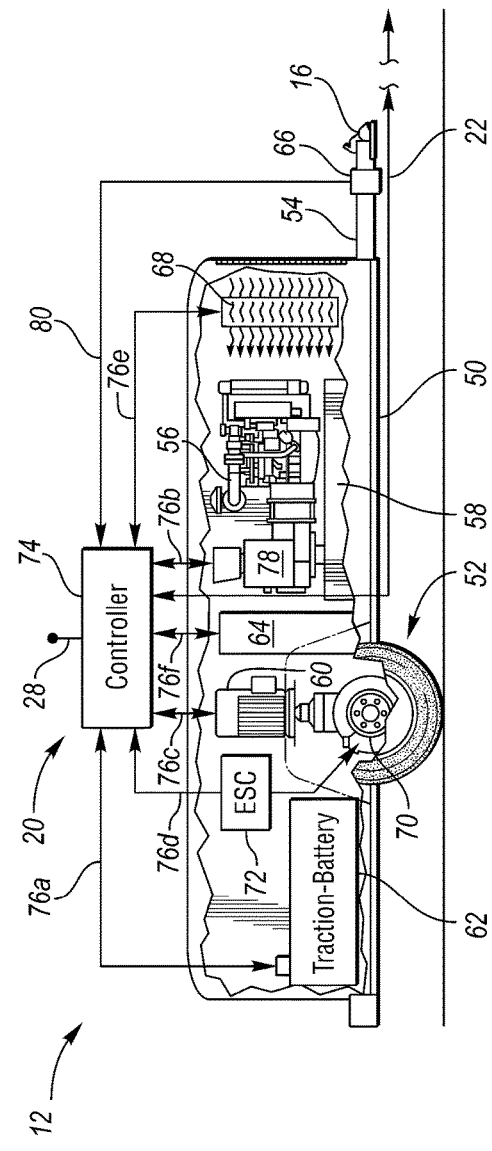

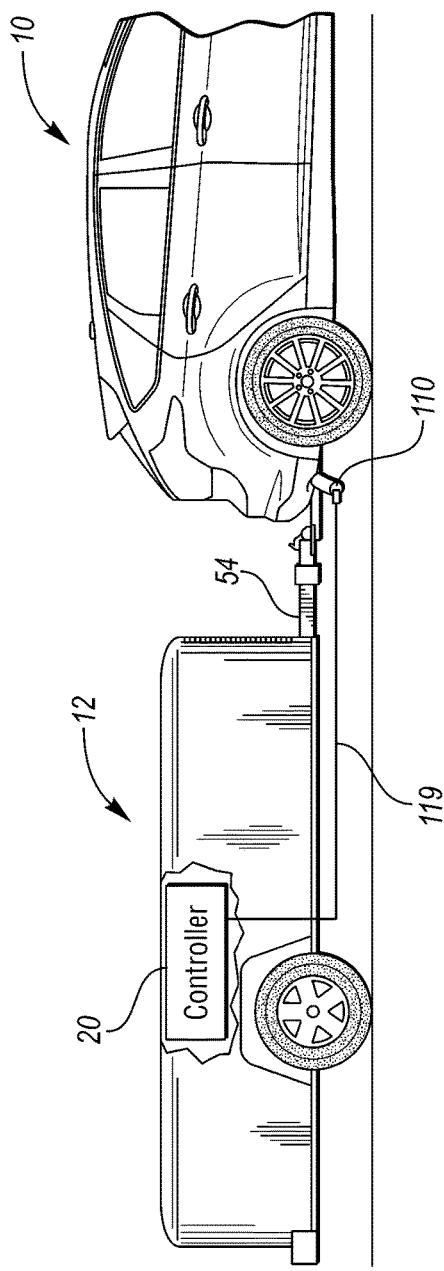
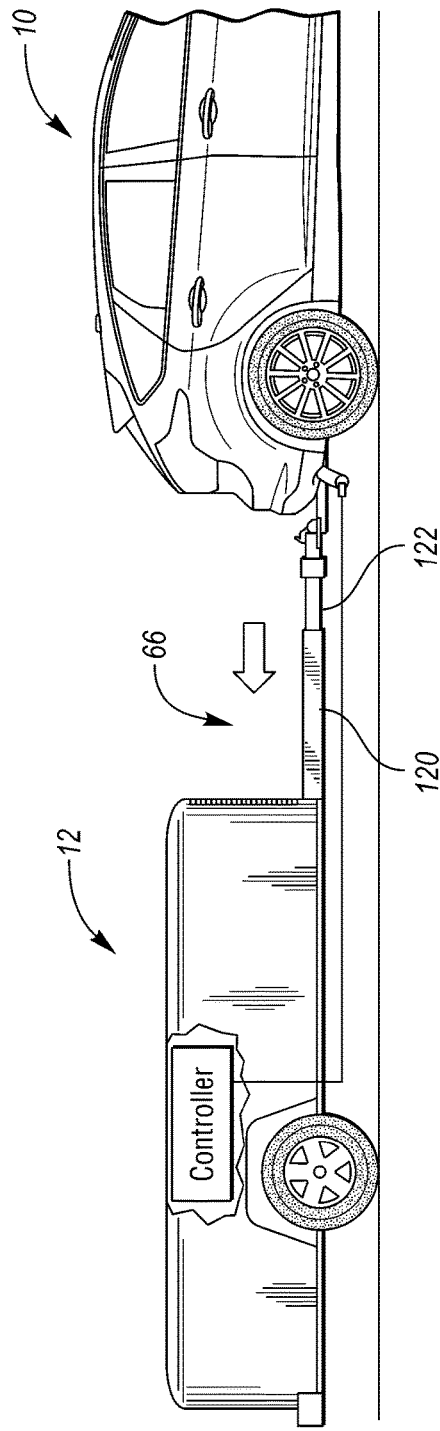

TRAILER FOR MEASURING OPERATING CHARACTERISTICS OF A VEHICLE

TECHNICAL FIELD

The present disclosure relates to a trailer for mounting to a test vehicle. The trailer is mechanical and communicatively connectable to the vehicle to measure operating characteristics of the vehicle.

BACKGROUND

Vehicular manufacturers often test vehicles to ensure that the vehicles pass a certain level of durability and quality over the designed life of the vehicle. Since the designed life of modern vehicles may exceed decades of time and high mileages, the testing is often accelerated and compressed to provide useful results in a shorter period of time. These tests may vary in elapsed time, distance traveled, and may be run on unique surfaces or at special venues.

One way to test high mileage durability is to continuously drive a vehicle on a large oval at a proving grounds facility.

SUMMARY

According to one embodiment, a vehicle trailer includes a frame that has a tongue configured to attach to a vehicle. The trailer also includes a powertrain configured to propel and brake the trailer independent from the vehicle. The trailer also includes a connecting member configured to attach to an exhaust of the vehicle. The connecting member includes an emissions sensor capable of detecting a content of emissions from the exhaust. At least one controller is coupled to the emissions sensor and configured to analyze the emissions.

A force gauge may be provided on the tongue to measure forces applied to the vehicle by the trailer. The at least one controller can be further programmed to operate the powertrain such that the force is maintained at a predetermined magnitude. The predetermined magnitude may be zero such that the trailer exerts zero force on the vehicle. The predetermined magnitude may be negative to simulate a hill ascent, and/or may be positive to simulate a hill descent. The emissions may be analyzed during a simulated level surface (zero force), simulated hill ascent (negative force) or simulated descent (positive force).

The predetermined magnitude may be preprogrammed to vary to simulate driving characteristics that represent a specific remote location. The at least one controller can analyze the emissions during a simulated drive of the specific remote location.

The powertrain can include an internal combustion engine and an electric motor that are each capable of propelling and braking the vehicle trailer.

The tongue may be adjustable in length. In one embodiment, the tongue includes a first tongue member attachable to the vehicle and a second tongue member telescopically arranged with respect to the first tongue member. Sliding of the first tongue member relative to the second tongue member adjusts the overall length of the tongue. A motor may be provided to move the second tongue relative to the first tongue to adjust the length.

A wheel may be mounted at a rear section of the trailer by a castering mechanism. A variable suspension system can be coupled to the wheel to supply a downward force to the wheel to account for a lift force of the trailer during operation. The wheel may exert no significant (e.g., less than 5 Nm) steering forces on the vehicle trailer.

According to another embodiment, a method of performing a coastdown test on a vehicle is provided. Using an attachment member, the trailer is attached to the vehicle. The trailer and the vehicle each have their own powertrain. The powertrain of the trailer is operated to propel the vehicle across a range of increasing speeds while the powertrain of the vehicle is in neutral. The forces required to propel the vehicle are measured across the range of speeds utilizing a force gauge on the attachment member.

According to another embodiment, a trailer for a vehicle includes a powertrain configured to propel and brake the trailer independent from the vehicle. At least one controller is configured to analyze emissions of the vehicle. A telescopic tongue is provided for attaching the trailer to the vehicle. A motor is configured to telescopically adjust a length of the tongue to minimize a drag force of the trailer acting on the vehicle.

BRIEF DESCRIPTION OF THE DRAWINGS

FIG. 1 is a diagrammatic view of a vehicle and an attached trailer for measuring operating characteristics of the vehicle, according to one embodiment.

FIG. 2 is a diagrammatic view of the trailer of FIG. 1 with additional detail regarding the powertrain and control system of the trailer, according to one embodiment.

FIG. 4 is a side view of the vehicle and the trailer of FIG. 1 with an exhaust sensor attached to the exhaust of the vehicle and to a controller or analyzer on the trailer, according to one embodiment.

FIG. 5 is a side view of the vehicle and the trailer of FIG. 1 with a telescoping tongue, according to one embodiment.

DETAILED DESCRIPTION

Figure 3:
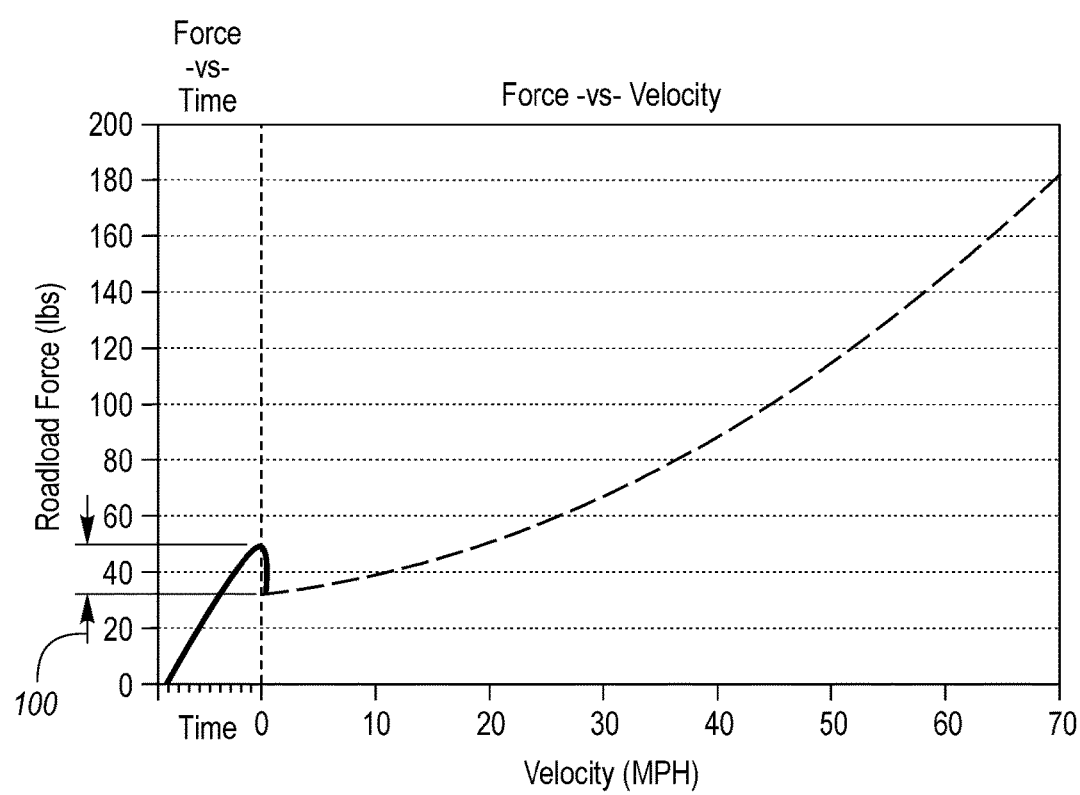
FIG. 3 is a graph of forces required to propel the vehicle from the trailer over time, according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

FIG. 1 illustrates a vehicle 10 connected to a trailer 12. As will be described below, the trailer 12 is capable of propelling (providing a pushing force to) and braking (providing a pulling force to) the vehicle 10. The trailer 12 is equipped with a control system that controls the powertrain of the trailer 12 such that minimal or no force is realized acting on the vehicle. This allows the trailer 12 to analyze the operating characteristics (e.g., emissions, fuel economy, road load horse power, etc.) of the vehicle 10 while not undesirably impeding the operation of the vehicle 10. As such, the vehicle 10 may be referred to as a test vehicle, and the trailer 12 may be referred to as a push/pull trailer or test trailer.

The vehicle is connected to the trailer 12 via a hitch 14 and hitch coupler 16. Trailer 12 may also be referred to as test trailer 12 or recharging trailer 12. The vehicle 10 has a vehicle traction battery 18 connected to a controller 20 on the trailer 12 via an electrical connection cable 22. The cable 22 has an electrical coupler 25 which allows the cable to connect to the traction-battery.

The trailer 12 may receive or supply energy to the vehicle 10. For example, the electrical coupler 25 may be a T-coupler 25 that connects in-line with the existing vehicle electric system. The T-coupler 25 may have a switch in a first position that provides for electrical current flow from the vehicle traction battery 18 to the vehicle 10 (as it normally would before the connection). The T-coupler 25 may be switched to a second position that cuts-off electric current flow from the vehicle traction battery 18 to the vehicle 10 (to the electric machine of the vehicle) and replaces it with an electrical current flow from the trailer 12 to the vehicle 10. The T-coupler 25 may also provide for a separate electrical current flow from the trailer 12 to the vehicle traction battery 18 simultaneous to the electric current flow being used to power the vehicle 10. The separate electrical flow may allow for the power supply to the vehicle 10 to be transferred from the vehicle traction battery 18 to the trailer 12, while simultaneously allowing the trailer 12 to charge the vehicle traction battery 18 through the single T-couple 25 connection. The trailer 12 may also provide an outlet (not shown) which may be connected to the vehicle's existing charge cable (not shown).

The controller 20 may be a power distribution device (as indicated here) or a power distribution device may be located separately from the controller 20. The controller 20 may be programmed to recognize when a vehicle traction-battery 18 has low charge (a predetermined charge level) and automatically switch power supply for the vehicle 10 over to the trailer 12. The controller 20 may obtain vehicle traction-battery 18 charge level directly from the vehicle traction-battery 18 through the T-coupler 25 and electrical connection cable 22, or via communication with a vehicle internal communication network 24.

A vehicle internal communication network 24 interconnects electronic systems within the vehicle 10. The network 24 may have certain protocols that are followed such as a Controller Area Network (CAN) or a Local Interconnect Network (LIN). Special requirements for vehicle control may be included in the network 24 such as assurance of message delivery, assured non-conflicting messages, assured time of delivery, EMF noise resilience, and the elimination of redundant routing.

The controller 20 may be in communication with the network 24 via a hard connection, as indicated by line 26, which is routed back through the electrical connection cable 22. The controller 20 may also include a trailer transceiver 28 for sending and receiving signals, as indicated by arrows 30. The vehicle 10 may also have a vehicle transceiver or transmitter 32 in communication with the network 24, which may also receive and/or transmit information as indicated by arrows 34. A portable transceiver or transmitter 32 may be plugged into an On-Board Diagnostics (OBD) connector (not shown) that has access to the network 24, if the vehicle 10 is not already equipped.

A control box 36 may be placed within the vehicle 10, and similarly may be in communication with the network 24 via a hard line connection as indicated by line 38, or have a control box transceiver 40 which may be in communication with the network 24 and/or the trailer 12, as indicated by arrows 42. The control box 36 may also be plugged into the OBD connector. When the control box 36 is plugged into the OBD connector, the control box transceiver 40 may function as the vehicle transceiver 32. The in-vehicle control box 36 may be in communication with the controller 20 to provide a user interface for an operator to provide user input to the controller 20.

FIG. 2 shows additional detail of the trailer 12 according to one embodiment. The trailer 12 is shown having a rolling frame 50 supported by an axle and wheels combination 52. The trailer 12 is shown as a single-axle trailer, however multiple axles may be used. The trailer 12 is also shown with a tongue 54 extending from the frame 50 with a hitch coupler 16 disposed on an end of the tongue 54 for connecting the trailer 12 to the vehicle 10. The trailer weight may be balanceable over the axle and wheels combination 52 to provide between zero and 100 pounds of vertical tongue weight on a hitch 14 (see FIG. 1) of the vehicle 10.

The trailer 12 may also have an engine 56, a fuel tank 58, an electric machine 60 (e.g., a motor/generator), and a trailer traction battery 62 disposed on the frame 50. The engine 56, electric machine 60, and trailer traction battery 62 are each capable of providing power to a vehicle 10 to either function as the power supply of the vehicle 10 or to recharge the vehicle traction battery 18. A traction-battery charger or recharging system 64 may be disposed on the trailer 12 to provide the charge to the vehicle traction battery 18 or to the trailer traction battery 62. The engine 56 and electric machine 60 may be referred to as a powertrain for the trailer 12. The powertrain may be considered to include the trailer traction battery 62 as well.

The controller 20 can be programmed to transfer power between the vehicle 10 and the trailer 12 to balance charges. For example, the controller 20 may be programmed to, in response to the vehicle traction battery 18 having a low charge or a user specified input, switch the power supply for the vehicle 10 from the vehicle traction battery 18 to the trailer traction battery 62. The controller 20 may be programmed to utilize the charging system 64 to recharge the vehicle traction battery 18. The charging system 64 may simulate a household charge, so that the vehicle traction battery 18 charges at a similar voltage and rate as if plugged into a wall outlet. The charging system 64 may provide a separate outlet (not shown) providing a United States mains electricity charge of an alternating current of substantially 120 volts and 60 Hertz in which the vehicle charge cord (not shown) may be attached thereto. Substantially, as used here, means within typical fluctuations of voltage and frequency as found in typical United States mains electricity charge lines and outlets. The energy used by the charging system 64 may come from the engine 56 and/or electric machine 60. The energy used by the charging system 64 may also come from the trailer traction battery 62.

The controller 20 may also be programmed to, in response to the vehicle traction-battery 18 reaching a predetermined upper charge level, such as being fully charged, switch the power supply for the vehicle 10 back to the vehicle traction-battery 18. The programming of the controller 20 may then utilize the charging system 64 to recharge to trailer traction-battery 62. The trailer traction-battery 62 may also be charged at a simulated household charge, or it may be charged directly by other systems on the trailer 12. The stopping of the vehicle traction-battery 18 charge may also be provided by the user through the control box 36.

The engine 56 and electric machine 60 may be configured to, in combination or alone, provide motive power for the trailer 12. The movement of the trailer 12 may be such that the trailer 12 substantially matches the vehicle dynamics, or speed, of the vehicle 10 to which it is attached so that the trailer does not provide much, if any, drag on the vehicle 10. Substantially, as used here, means that the rate of response of the trailer dynamics when compared to the vehicle dynamics is within 10%. This alone or combined with the minimal tongue weight placed on the hitch 14 of the vehicle 10 provides for the trailer being relatively invisible to the vehicle 10 and as such provides minimal influence to the testing on the vehicle. Additional description of minimizing the forces acting on the vehicle 10 from the trailer 12 is described below.

The trailer 12 may have a force gauge 66 disposed on the tongue 54. The force gauge 66 is configured to measure forces applied to the vehicle 10 from the trailer 12, and/or forces applied to the trailer 12 from the vehicle. The force gauge 66 may be a tension/compression sensor or longitudinal sensor. The force gauge 66 is also coupled to the controller 20 via line 80. The controller 20 can be programmed to operate the powertrain of the trailer 12 based on the forces from the force gauge 66 in order to minimize the impact of the forces from the trailer 12. For example, if a tension force is recognized by the force gauge 66, it can be inferred that the trailer 12 is providing a pulling force on the vehicle 10. In response to such a tension force, the controller 20 can power the engine 56 and/or electric machine 60 to providing a pushing force to the tongue 54 to reduce the forces realized by the force gauge 66. This can happen continuously to maintain the forces realized by the force gauge at a predetermined threshold, such as zero. Doing so minimizes or eliminates the realized forces acting on the vehicle 10 from the trailer 12, allowing the trailer to analyze real-world operating characteristics of the vehicle 10 that would be operating as if there were no trailer 12 attached to the vehicle.

The controller 20 may be programmed to utilize the electric machine 60 to assist in the retarding of the trailer 12. The electric machine 60 may provide a regenerative braking process to retard the trailer 12. The energy created through the regenerative braking process may be used to charge either the vehicle or trailer traction batteries 18, 62. The energy created through the regenerative braking process may also be directed by the controller 20 to a power absorption unit 68.

The controller 20 may be programmed to recognize any scenario in which additional charging power would be undesirable, and as such redirect the energy to the power absorption unit 68 to dissipate energy. This may be done in the case where both the vehicle and trailer traction-batteries 18, 62 are at or above a predetermined charge limit and further charging is not desired. The power absorption unit 68 may be air cooled. The power absorption unit 68 may be a resistance type absorption unit.

The trailer 12 may also have a friction braking system 70 to aid in the retarding of the trailer 12. The controller 20 may be programmed to, in response to an indication of vehicle dynamics, operate the friction braking system 70, in combination with the engine 56 and/or electric machine 60, or alone, to decelerate the trailer 12 to substantially match vehicle dynamics. The trailer may also have an electronic stability control (ESC) system 72 and the controller 20 may be capable of controlling the friction braking system 70 through the ESC system 72 to provide further stability for the trailer. The trailer 12 may be further equipped with additional sensors, such as a sway sensor (not shown), to provide stability information, and the controller may utilize the engine 56, electric machine 60, and/or friction braking system (with or without ESC), in any combination, to control and stabilize the trailer 12 during use.

As will be further described below, the trailer 12 may also be used to push, pull or drag the vehicle 10 to simulate a hill descent or hill ascent. The controller 20 may be programmed to operate the engine 56 and/or electric machine 60 to provide a force in the direction of vehicle movement and push the vehicle to simulate a hill descent on the vehicle. In the case of the trailer 12 being attached to a rear portion of the vehicle 10, the controller 20 may be programmed to operate the engine 56 and/or electric machine 60 to drive the forces detected by the force transducer 66 toward a predetermined compression force. In this case, the target value would be greater than zero in a direction of vehicle movement and will provide a predetermined force on the vehicle 10 in a direction of the vehicle 10. A substantially constant compression force on the vehicle 10 will provide a propulsion of the vehicle 10 and may be metered in such a way as to simulate gravitational acceleration of a vehicle 10 down a hill.

As will also be further described below, the controller may be further programmed to utilize the engine 56, electric machine 60 (regenerative braking), and/or the friction braking system 70, in combination or alone, to provide forces on the vehicle opposite to vehicle movement to simulate a hill ascent. In the case of the trailer 12 being attached to a rear portion of the vehicle 10, the controller 20 may be programmed drag the trailer to drive the forces detected by the force transducer 66 toward a predetermined tension force. In this case, the target value would be greater than zero in a direction of opposite of vehicle movement and would provide a predetermined force on the vehicle 10 in a direction opposite to the direction the vehicle 10 is traveling. A substantially constant tension force on the vehicle 10 will provide a drag on the vehicle 10 and may be metered in such a way as to simulate gravitational deceleration of a vehicle 10 traveling up a hill. As above, the electric machine 60 may provide a regenerative braking force during this mode of operation and the energy recovered may be utilized to provide power to the charging system 64, the vehicle traction-battery 18, or the trailer traction-battery 62. The examples above are for a trailer 12 connected to the rear of a vehicle 10, however the trailer 12 may be attached to the front of a vehicle 10, in which case the forces applied to the vehicle may be swapped accordingly.

The controller 20 may be a power distribution center 74, and as such the controller may be in electrical communication with the components on the trailer 12 as indicated by arrow lines 76. Arrow lines 76 indicated both a physical connection with the controller 20, for power distribution, as well as communication with the controller 20, for control of the component. For example, line 76*a* between the controller 20 and the trailer traction-battery 62 indicates a control line for monitoring the trailer traction-battery charge level, as well as for moving electric current from the trailer traction-battery 62 to the vehicle 10 or for moving electric current toward the trailer traction-battery 62 when recharging. Line 76*b* indicates a control line for running the engine 56 to propel the trailer 12 and also for running the engine 56 to recharge a battery 18, 62. Line 76*b* then also indicates the moving of electric current generated by a generator 78 attached to the engine 56.

A clutch system (not shown) may be used to switch the engine 56 between driving an automatic transmission connected to the axle and wheels combination 52 to propel the trailer (also not shown) or the generator 78 to provide power. The controller 20 may be in communication with the clutch system and transmission and used to engage/disengage the clutch as well as shift the transmission, depending on the needs of the trailer at any given time.

Line 76*c* indicates both a control line between the controller 20 and the electric machine 60 and a mode for electric current to travel. In the case of using the electric machine 60 to drive the trailer, electric current will move from the controller 20 toward the electric machine 60. In the case of using the electric machine to harvest regenerative braking power, current may run from the electric machine 60 toward the controller 20. The electric machine 60 may also be connected to a transmission system and may also have a clutch system to disengage it from the same (also not shown).

Line 76*d* is a control line, and any current flowing through the line would be what was needed to run the ESC system 72 or power a servo (not shown) to operate the friction braking system 70. Line 76*e* indicates where the controller may dump electric current toward the power absorption unit 68 to dissipate energy. Line 76*f* is between the charging system 64 and controller 20, and like above this line indicates control of the charging system as well as electrical current transfer.

Line 22 is a representation of the electrical connection cable 22 that runs between the trailer 12 and the vehicle 20 as indicated above. Line 80 is an indication of the communication between the force transducer 66 and the controller. Although all of these lines are shown disposed between the respective devices and the controller 20 as a central component, there may also be a matrix of other lines that connect devices directly without having to go through the controller 20. Also as mentioned above, the controller 20 may be a power distribution center 74, the controller 20 and power distribution center 74 may be two separate components.

Testing of a vehicle can include what is known as a "coastdown" test. A vehicle coastdown test is a test methodology and procedure that is used to estimate how much energy is required to move a vehicle (i.e., road load) over the road under a wide range of speeds. The coastdown test can lead to a computation of the force (lbf/mph) required to propel the vehicle, Horsepower (HP @ speed), and Pferdestärke (PS @ speed). The information and data that is derived from the coastdown test can be used to set vehicle-specific power absorption settings on a chassis dynamometer. Chassis dynamometers are used by automotive manufacturers and by the Environmental Protection Agency to accomplish full vehicle emissions and fuel economy testing.

Current coastdown tests include, briefly, a test vehicle being driven on a test track surface that is straight, level, and of adequate length that will allow the vehicle to be exercised as follows. The vehicle is first accelerated to a stable speed, such as 80 mph. The data acquisition then starts. The throttle is released, and the transmission is put into Neutral. The vehicle is allowed to coast from 80 mph to roughly 10 mph, with no steering or braking, while the data is acquired. This can be repeated in multiple times in each direction. The data acquired includes vehicle speed, time, and vehicle relative air speed and direction (e.g., from a vehicle-mounted anemometer). A decelerating force can then be calculated knowing the vehicle mass and the deceleration rate of the vehicle. A roadload Horse Power (HP) can be calculated knowing the decelerating force and the speed of the vehicle. In short, the known mass of the vehicle together with the data acquired regarding the speed, wind effects, and time to decelerate the vehicle can lead to a determination of the forces required to propel the vehicle at any given speed. This data can then be used by the dynamometers to evaluate the emissions (for example) of the vehicle when traveling at a certain speed or operating at a specific road load.

This method of coastdown testing comes with inherent variables, such as environmental effects for example. Also, the coastdown testing does not provide a direct method of measuring the forces required to propel the vehicle (road load), but instead an indirect method with several steps of mathematical comparisons and calculations.

According to various embodiments of this disclosure, a system is provided for directly measuring the forces required to propel the vehicle at any speed. With the vehicle 10 providing to propulsion force, the trailer 12 can propel the vehicle 10, and the measured forces at the force gauge 66 can represent the forces required to propel the vehicle 10. This type of test can be referred to as a "push-up test" as opposed to the conventional "coastdown test".

FIG. 3 represents an example of results from a push-up test. The vehicle is on, but its transmission or powertrain is in Neutral gear. The trailer 12 is activated to begin providing a propulsion force from its on-board engine, the electric machine, or both. The forces are measured at the force gauge 66. Initially, these forces are ramped up prior to velocity being realized. This represents the forces required to gain momentum and propel the vehicle from a stopped state. At time t=0, the velocity of the vehicle 10 and the trailer 12 begin to increase from zero. As represented by arrow 100, the force required to propel the vehicle is initially increased and then sharply dipped down once the vehicle begins moving at t=0. This range 100 represents the forces required to overcome friction forces, etc. to gain momentum. The force then levels off, and steadily increases as the speed of the vehicle (and trailer) increases.

A push-up test may take as long as necessary to accelerate the vehicle at a controlled rate such that the propelling of the vehicle across the range of speeds is done while minimizing the effects of the acceleration forces of the vehicle during the data acquisition. A single test may take upward of 30 seconds or longer, depending on the vehicle.

While FIG. 3 ends at 70 mph, it should be understood that the push-up test can continue until other speeds are reached, such as 80 mph or 90 mph.

The push-up test described above enables the trailer 12 to provide the force required to propel the vehicle at any speed from 0 mph to ~90 mph. A direct measurement of the force at the tongue corresponds to a direct measurement of the forces required to propel the vehicle (road load). No extra mathematical conversions or calculations would be required, yielding an accurate and direct result. The detected road load can then be used in the dynamometers as described above.

FIG. 4 illustrates the trailer 12 being utilized as an emissions testing device for the vehicle 10. The trailer includes an exhaust analyzing device, such as the controller 20 described above or another controller. A connecting member 110 is mounted, adhered to, or otherwise coupled to the exhaust of the vehicle 10. The connecting member 110 may include a probe or the like that has an exhaust emissions sensor. The exhaust emissions sensor is capable of detecting the content of the emissions that exit the vehicle 10. A signal containing data regarding the content of the emissions from the exhaust is transferred to the controller via a connection 112. The controller receives the signal and evaluates the signal for determination of the content of the exhaust (e.g., % CO2, % CO, % H2O, etc.)

The trailer 12 can follow the vehicle 10 and evaluate the exhaust emissions while minimizing or eliminating the forces applied to the vehicle 10 to minimize or eliminate the chance of skewed data due to the presence of the trailer 12. For example, the controller 20 can be programmed to provide a push or pull force via the on-board engine 56 or electric machine 60 while the vehicle 10 such that the force measurement output by the force gauge 66 is at or near zero.

The trailer 12 can also simulate the terrain of a remote location and test the emissions as if the vehicle 10 were driving at that remote location. For example, the elevation, road terrain, grade, etc. of a specific road at a specific location can be programmed into the controller 20. The controller 20 can then utilize the engine 56 and electric machine 60 to simulate the road of that specific remote location. This can be done similar to the hill ascent and descent described above. The driver of the vehicle 10 would then feel simulated hill ascents and descents that are representative of the remote location even though the vehicle 10 is traveling on a flat road. The analyzer or the controller can analyze the emissions from the exhaust during the simulated driving route.

FIG. 5 illustrates one embodiment in which the tongue 66 is extended to increase the distance between the vehicle 10 and the trailer 12. The tongue can be telescopic in nature such that it can extend and retract. For example, the tongue 54 can include a first tongue member 120 that has an inside diameter or profile that is larger than an outside diameter or profile of a second tongue member 122. This allows the second tongue member 122 to fit within the first tongue member 120 during telescopic movement of the tongue 54.

In one embodiment, an electromechanical device such as a motor is provided at the front end of the trailer 12 and is connected to the second tongue member 122. The motor moves the first tongue member linearly into and out of the trailer 12 to retract and extend the tongue, respectively. The adjustment of the length of the tongue 66 can be done automatically to adjust for wind and aerodynamic properties of the vehicle 10, or can be done manually by a user depressing a button on a user interface that correspondingly causes movement of the tongue.

By virtue of the fact that the trailer 12 can generate a significant pushing and pulling force on the vehicle 10, during the delivery of a high level pushing force, the tongue 54 of the trailer can become very light (in the Z axis). Without proper accounting for, this may produce a lifting (negative) force at the tongue 54 at the hitch point of the tow vehicle 10. While not high in magnitude, this lifting force at the hitch point of the vehicle 10 is not desirable, nor is it a favorable condition with respect to the overall dynamic stability of the vehicle/trailer combination.

Figure 6A:
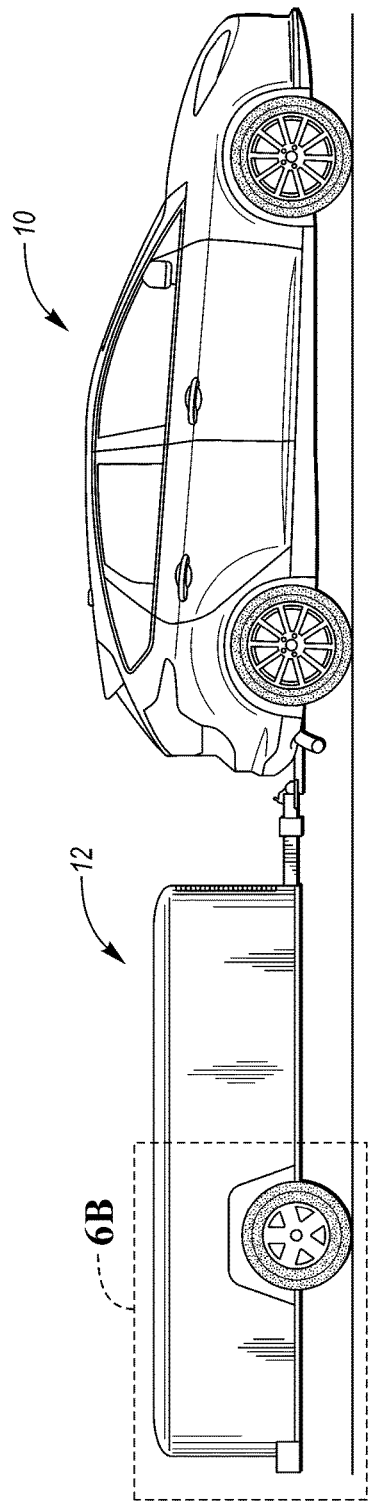
FIG. 6A is a side view of the vehicle and the trailer of FIG. 1
Figure 6B:
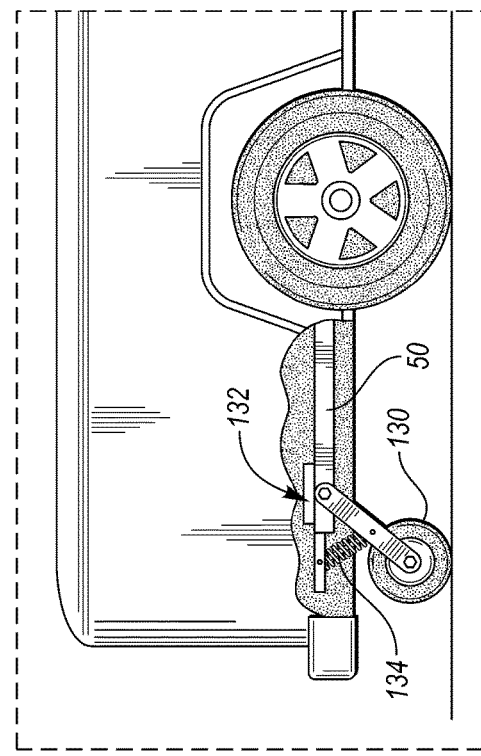
FIG. 6B illustrates a tongue load adjustment mechanism at a rearward wheel of the trailer, according to one embodiment.

Accordingly, FIGS. 6A-6B illustrate a mechanism for providing a downward (negative Z-axis) force to account for the lifting force during travel. This mechanism includes rear wheel 130 (third wheel) for supplying the downward force. The wheel 130 is mounted at a rear section of the frame 50 of the trailer 12. The wheel 130 is mounted to the frame 50 by a castering mechanism 132. This wheel would exert no steering forces on the trailer 12. A variable suspension system 134 is also provided to adjust the magnitude of downward force being applied. The suspension system 134 has an operational range from being completely retracted from the road surface, to a preset maximum downward force to counteract the lift force described above. The suspension system 134 may include a spring and/or hydraulics to vary the downward force. As the suspension system 134 is set to provide an increasing force, the downward force increases to account for an increasing anticipated lift force.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle trailer comprising:
   a frame including a tongue configured to attach to a vehicle;
   a powertrain configured to propel and brake the vehicle trailer independent from the vehicle;
   a connecting member configured to attach to an exhaust pipe of the vehicle and including an emissions sensor configured to detect content of emissions from the exhaust pipe;
   at least one controller coupled to the emissions sensor and configured to analyze the content of the emissions; and
   a force gauge configured to measure force applied to the vehicle by the trailer, wherein the at least one controller is further configured to operate the powertrain such that the force is maintained at a predetermined magnitude.

2. The vehicle of claim 1, wherein the at least one controller is further configured to selectively operate the powertrain such that predetermined magnitude is zero, and to analyze the emissions while the predetermined magnitude is zero.

3. The vehicle trailer of claim 1, wherein the at least one controller is further configured to selectively operate the powertrain such that the force acts in a direction opposite a travel direction of the vehicle to simulate a hill ascent event, and analyze the emissions during the hill ascent event.

4. The vehicle trailer of claim 1, wherein the at least one controller is further programmed to selectively operate the powertrain such that the force acts in a same direction as a travel direction of the vehicle to simulate a hill descent event, and analyze the emissions during the hill descent event.

5. The vehicle trailer of claim 1, wherein the at least one controller is further configured to vary the predetermined magnitude to simulate driving characteristics representative of a specific remote location.

6. The vehicle trailer of claim 1, wherein the powertrain includes an internal combustion engine and an electric motor that are each configured to propel and brake the vehicle trailer.

7. The vehicle trailer of claim 1, wherein the tongue is further configured to be adjustable in length.

8. The vehicle trailer of claim 7, wherein the tongue includes a first tongue member attachable to the vehicle and a second tongue member telescopically arranged with respect to the first tongue member.

9. The vehicle trailer of claim 8, further comprising a motor configured to move the second tongue member relative to the first tongue member to adjust a length of the tongue.

10. The vehicle trailer of claim 1, further comprising a wheel that is mounted at a rear section of the vehicle trailer by a castering mechanism, and a variable suspension system configured to supply a downward force to the wheel.

11. The vehicle trailer of claim 10, wherein the wheel is configured to not exert steering forces on the vehicle trailer exceeding 5 Nm.

* * * * *